Dec. 13, 1927.　　　　P. J. DARLINGTON　　　　1,652,854
MICROMETER CALIPER
Filed April 14, 1927　　　2 Sheets-Sheet 1
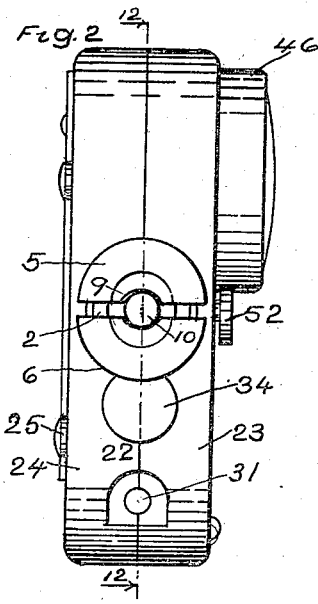
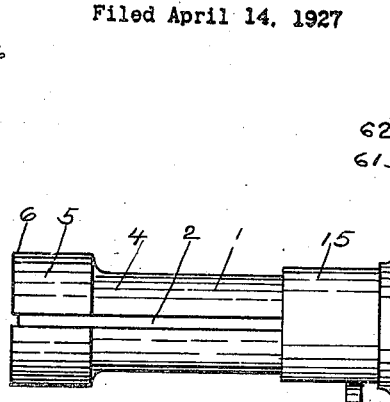
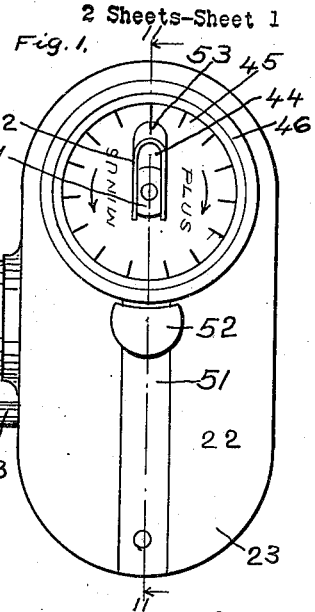
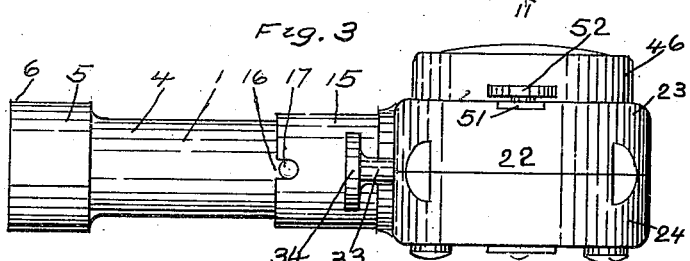
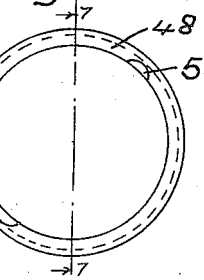
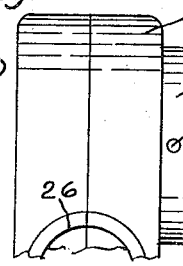
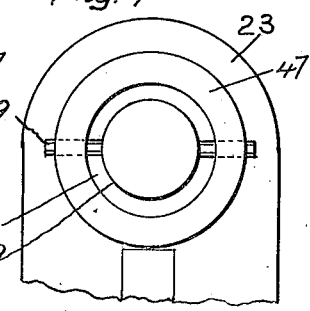
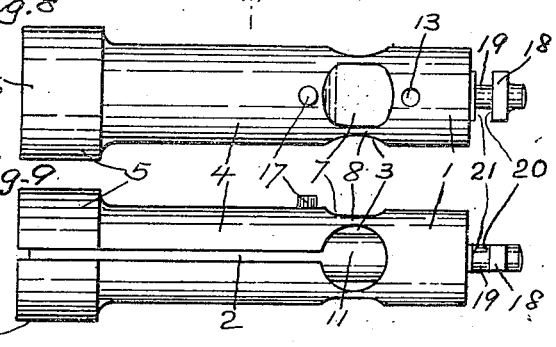
INVENTOR
Philip J Darlington Dec. 13, 1927.
P. J. DARLINGTON
MICROMETER CALIPER
Filed April 14, 1927   2 Sheets-Sheet 2
1,652,854
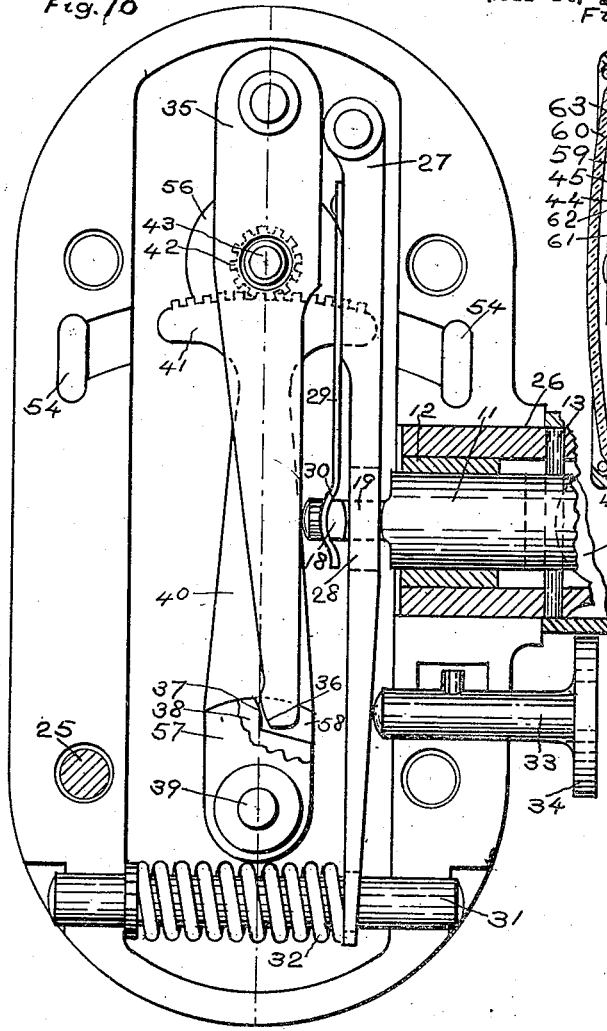
INVENTOR
Philip J. Darlington Patented Dec. 13, 1927.

1,652,854

UNITED STATES PATENT OFFICE.

PHILIP J. DARLINGTON, OF BROOKLINE, MASSACHUSETTS.

MICROMETER CALIPER.

Application filed April 14, 1927. Serial No. 183,684.

This invention relates to micrometer calipers of the class which are designed for taking internal measurements, more especially of the comparator type, that is, those in which an index is set to read zero on a scale when the instrument is applied to a reference standard, and then used to indicate small differences therefrom of the diameters of holes or bores of machine parts in the process of production or inspection.

The object of the present invention is to provide an instrument of this character which is cheaper to make, and more rapid, reliable, durable, and adaptable than those of similar character in common use.

The device illustrated as embodying the invention comprises a plug that has a measuring end which normally contracts and that contains a plunger by means of which the measuring end may be expanded, which plug is detachably clamped to a casing that encloses mechanism arranged to, by spring pressure, force the plunger outward and cause the measuring end of the plug to expand, and by manual pressure withdraw the plunger and allow the measuring end of the plug to contract, which mechanism is coupled to and responds to the movements of the plunger and amplifies those movements on an index which travels over an adjustable graduated dial and thereby indicates the degree of expansion of the measuring end of the plug.

Different sizes of interchangeable plugs are employed for measuring different basic diameters, and this invention includes means whereby a plug of any desired size may be quickly clamped in the casing and operatively coupled to the amplifying and indicating mechanism therein.

In the accompanying drawings Fig. 1 shows a front view of an instrument that embodies the invention. Fig. 2 shows an edge view. Fig. 3 shows a bottom view. Fig. 4 shows a front view of a portion of the indicator end of the casing with the bezel and dial removed. Fig. 5 is an edge view of what is shown in Fig. 4. Fig. 6 is a view looking into the indicator bezel from the inside. Fig. 7 is a cross section of the bezel on the plane indicated by the line 7—7 on Fig. 6. Fig. 8 is a side view of the expansion plug. Fig. 9 is a plan view of the plug. Fig. 10 is a view, on much larger scale, looking into the front section of the casing. Fig. 11 is a section on enlarged scale on the plane indicated by the dot and dash line 11—11 on Fig. 1. Fig. 12 is a section of the expansion plug on the line 12—12 on Fig. 2, with the expanding plunger therein. Fig. 13 is a view of the expansion end of the plug. Fig. 14 is a view of the inner end of the plunger. Fig. 15 is a plan view of the index arm.

The plug 1 is tubular and has a longitudinal slot 2 extending from the outer end to a transverse hole 3, which slot divides the plug into longitudinally extending limbs 4 that terminate in gauging extensions 5 on the exterior of which are the contact or measuring surfaces 6. External flats 7 are formed on the plug adjacent to the transverse hole 3 to render the sections 8 of the plug flexible, that is, so that they will yield and allow the measuring end of the plug to readily expand and contract.

The bore of the plug in the expansible measuring end has conical seats 9 and adapted to engage these seats is the conical end 10 of the plunger 11 that is movable longitudinally in the bore of the plug. The external measuring contact surfaces 6 of the plug are preferably shaped to fit a cylindrical wall when the plug is contracted to the smallest bore to be measured. The conical seats 9 in the plug are preferably shaped to fit the conical end 10 of the plunger when the plug is expanded to its largest diameter. A bushing 12 in the inner end of the plug supports the inner end of the plunger. A pin 13 passes through a slot 14 in the plunger and extends into the plug to prevent the rotation of the plunger without interfering with its longitudinal movement. A sleeve 15 slipped upon the plug covers the hole 3 and flats 7 and retains the pin 13 in place. This sleeve has a notch 16 adapted to engage a pin 17 projecting from the plug to prevent the sleeve from displacement. The plunger at its rear end has a cross head 18 that extends transversely from a cylindrical neck 19 and provides shoulders 20 and 21.

The casing 22 has a front section 23 and the back section 24, which sections are fastened together by screws 25. Each of the casing sections has a semi-cylindrical socket 26 into which, when the sections are together, the inner end of the plug is seated and clamped.

An operating lever 27, pivoted at one end in the casing, has a longitudinally extending slot 28 of such shape and size that the cross head 18 of the plunger may, when turned to one position be passed through it. After the cross head is passed through the slot, by giving the plug a quarter turn the parts become detachably coupled together with the lever embracing the neck 19 on the end of the plunger between the shoulders 20 and 21. The screws are then turned up to tighten the casing sections and clamp the end of the plug between them. In order to disengage the parts the casing sections are loosened and then the plug may be given a quarter turn and drawn out. Another plug of a different size may be substituted by manipulating the parts in like manner. A spring 29 that is attached to the lever 27 has a forked end 30 which bears upon the cross head 18 to prevent the accidental turning and uncoupling of the plunger from the operating lever when the plug only is to be removed and another substituted.

The free end of the operating lever embraces a pin 31 located between the casing sections. On the pin is a spring 32 tensioned to normally force the lever 27 in a direction to advance the plunger and through the engagement of the conical surfaces expand the plug. A bolt 33 provided with a thumb piece 34 is loosely located between the sections of the casing in such position that it may be pushed inward against the lever 27. When this bolt is pushed in the lever retracts the plunger and the plug is allowed to contract.

An amplifying lever 35 is pivoted in the casing in position to be engaged by the inner end of the plunger. The free end of this lever is formed with an involute surface 36 adapted to engage an involute surface 37 on a plate 38 that is fastened on a spindle 39, to which an arm 40 is also fastened. Guide plates 57 and 58, carried by the spindle 39 retain the involute surfaces in alignment. At its free end this arm has a segmental rack 41 which engages a pinion 42 on a spindle 43. Attached to the front end of this spindle 43 is an index pointer 44. The index pointer illustrated comprises a central hub 61 secured between the arms of a V-shaped member 62 whose outer end 63 is inclined to the axis and is externally marked with an index line 53 which reads in connection with the graduations of the dial. This index pointer is arranged to rotate over the graduated dial 45 that is carried by a bezel 46 which is rotatably mounted on a hub 47 on the front of the casing. The bezel has an internal flange 48 that extends under pins 49 which project radially from the hub 47 with their inner ends seated on the inner wall 59 of an annular channel 60 formed in the face of the hub 47. Notches 50 in the flange permit the removal of the bezel when so turned that the notches register with the pins. The bezel and dial may be turned on the hub on the front of the casing but are frictionally held in the position to which they are adjusted by the outward pressure of a flat spring 51 seated in the front of the casing and furnished with a push button 52. When this button is pushed in the bezel is released so that it may be turned to effect the desired relation of the dial and index pointer.

Cushions 54 (Fig. 10) are seated in the walls of the casing to limit the travel of the segmental rack 41. A coil spring 55 connected between a cup 56 set into the casing and the spindle 43 (Fig. 11) takes up any back lash of the mechanism and keeps the parts in operative contact.

The end of a plug of the desired size is inserted into the casing in such position that the cross head at the end of the plunger will pass through the lever 27. The plug and plunger are then rotated so as to couple the parts together, after which the plug is clamped by tightening the casing screws. When the device is to be used the thumb piece 34 of the bolt 33 is pushed inward so as to swing the lever 27 in such direction as to retract the plunger and allow the measuring end of the plug to contract. The contracted measuring end is inserted into a standard gauge and then released and allowed to expand and the dial set so that the index reads zero, by rotating the bezel. The instrument may then be, with the measuring end of the plug contracted, inserted into the hole to be gauged, manually released, and the measuring end of the plug expanded by the plunger. As the plug expands the plunger advances, maintaining pressure of its conical end upon the conical surfaces in the measuring end of the plug, and in this condition the position of the index over the dial shows how much the opening being measured is larger or smaller than the standard opening.

When it is desired to replace a plug by one having a measuring end with a different exterior diameter, but using the same plunger, after the plug is unclamped, the sleeve 15 is slipped on the plug and the pin 13 removed, allowing the separation of the plug and plunger. The plunger is replaced in the casing and a plug of the desired size may be inserted and clamped in place.

The invention claimed is:—

1. A micrometer caliper having a casing, indicating means mounted in the casing, an expansible gauge plug, means for expanding the plug, mechanism intermediate the indicating means and plug expanding means for transmitting the movements of said expanding means to the indicating means, and means for detachably coupling said expanding means to said transmitting mechanism whereby expansible gauge plugs and expanding means of different sizes may be substituted and connected with the indicating means.

2. A micrometer caliper having a casing, indicating means mounted in the casing, a slotted tubular expansible gauge plug, a tapering plunger for, by an outward movement through the plug, expanding the slotted end of the plug, mechanism intermediate the indicating means and plunger responsive to and transmitting the movements of said plunger to the indicating means, and means detachably coupling said plunger to said transmitting mechanism.

3. A micrometer caliper having a casing, indicating means mounted in the casing, a slotted tubular expansible gauge plug, a tapering plunger for, by an outward movement through the plug, expanding the plug, mechanism intermediate the indicating means and plunger responsive to and amplifying the movements of said plunger on said indicating means, and means detachably coupling said plunger to said amplifying mechanism.

4. A micrometer caliper having a casing, indicating means mounted in the casing, an expansible gauge plug, a tapering plunger for expanding the plug, mechanism intermediate the indicating means and plunger for transmitting the movements of said plunger to the indicating means, an operating lever, and means for detachably coupling said plunger to said operating lever.

5. A micrometer caliper having a casing, indicating means mounted in the casing, an expansible gauge plug, a tapering plunger for expanding the plug, mechanism intermediate the indicating means and plunger for transmitting the movements of said plunger to the indicating means, an operating lever, means for detachably coupling said plunger to said operating lever, a spring for forcing said lever in one direction and a thumb bolt for forcing the lever in the opposite direction.

6. A micrometer caliper having a casing, indicating means mounted in the casing, a slotted tubular expansible gauge plug, a tapering plunger longitudinally movable in and non-rotatable with relation to the plug and adapted to expand the slotted end of the plug, means detachably connecting the plunger and plug, mechanism intermediate the indicating means and plunger for transmitting the movements of said plunger to the indicating means, and means for detachably coupling said plunger to said transmitting mechanism.

7. A micrometer caliper having a casing, indicating means mounted in the casing, an expansible gauge plug, a tapering plunger for expanding the plug, mechanism intermediate the indicating means and plunger responsive to and transmitting the movements of said plunger to the indicating means, a slotted operating lever, a cross head on the plunger adapted to be passed through said slot and detachably coupled to the operating lever, a spring tensioned to force the operating lever in one direction, and a thumb bolt for forcing the operating lever in the opposite direction.

8. A micrometer caliper having a casing, indicating means mounted in the casing, an expansible gauge plug, a tapering plunger for expanding the plug, mechanism intermediate the indicating means and plunger responsive to and transmitting the movements of said plunger to the indicating means, means for detachably coupling said plunger to said transmitting mechanism, and means for detachably connecting the gauge plug to the casing whereby said plug may be removed and another substituted without disturbing the plunger and indicating means.

9. A micrometer caliper having a casing, indicating means mounted in the casing, an expansible gauge plug, a tapering plunger for expanding the plug, mechanism intermediate the indicating means and plunger responsive to and transmitting the movements of said plunger to the indicating means, means for detachably coupling said plunger to said transmitting mechanism, and means for detachably connecting the gauge plug to the casing whereby said plug may be removed and another substituted without disturbing the plunger and indicating means.

10. A micrometer caliper having a casing, indicating means mounted in the casing, an expansible gauge plug attached to the casing, a tapering plunger longitudinally movable within and adapted to expand the plug, mechanism intermediate the indicating means and plunger responsive to and transmitting the movements of said plunger to the indicating means, and means for detachably coupling said plunger to said transmitting mechanism, said indicating means comprising an index pointer responsive to the movements of the plunger, and a graduated dial rotatably mounted on the casing.

11. A micrometer caliper having a casing, indicating means mounted in the casing, an expansible gauge plug, a tapering plunger for expanding the plug, mechanism responsive to and transmitting the movements of said plunger to the indicating means, and means for detachably connecting the gauge plug to the casing whereby said plug may be removed and another substituted without disturbing the plunger and indicating means.

PHILIP J. DARLINGTON.